United States Patent [19]

De Haan et al.

[11] Patent Number: 5,365,280
[45] Date of Patent: Nov. 15, 1994

[54] METHOD AND APPARATUS FOR DISCRIMINATING BETWEEN MOVIE FILM AND NON-MOVIE FILM AND GENERATING A PICTURE SIGNAL PROCESSING MODE CONTROL SIGNAL

[75] Inventors: Gerard De Haan; Hendrik Huijgen; Paul W. A. C. Biezen; Olukayode A. Ojo, all of Eindhoven, Netherlands

[73] Assignee: U.S. Philips Corporation, New York, N.Y.

[21] Appl. No.: 75,653

[22] Filed: Jun. 11, 1993

[30] Foreign Application Priority Data

Jun. 26, 1992 [EP] European Pat. Off. ........ 92201895.7

[51] Int. Cl.[5] .............................................. H04N 5/253
[52] U.S. Cl. ..................................... 348/699; 348/97; 348/526
[58] Field of Search ....................... 358/105, 136, 167; 348/526, 97

[56] References Cited

U.S. PATENT DOCUMENTS

| | | | |
|---|---|---|---|
| 4,679,086 | 7/1987 | May | 358/167 |
| 4,864,398 | 9/1989 | Avis et al. | 358/140 |
| 5,057,921 | 10/1991 | Robert et al. | 358/140 |
| 5,068,724 | 11/1991 | Krause et al. | 358/133 |

Primary Examiner—Mark R. Powell
Assistant Examiner—Cheryl Cohen
Attorney, Agent, or Firm—Michael E. Marion

[57] ABSTRACT

In a method of controlling a picture signal processing mode, first and second motion vectors are determined (ME, $D_T$) for first and second fields, and a picture signal processing mode control signal is obtained by comparing ($D_T$, -, COMP-R) the first and second motion vectors. The control signal may be transmitted along with, for example, a HDTV signal to give an indication to a TV receiver whether the signal originated from movie-film or from non-movie-film or be generated within the receiver.

20 Claims, 2 Drawing Sheets

METHOD AND APPARATUS FOR DISCRIMINATING BETWEEN MOVIE FILM AND NON-MOVIE FILM AND GENERATING A PICTURE SIGNAL PROCESSING MODE CONTROL SIGNAL

BACKGROUND OF THE INVENTION

The invention relates to a method of and apparatus for controlling a picture signal processing mode. The picture signal processing mode may indicate whether the picture signal originates from movie-film and, more specifically, how the fields of the picture signal relate to the pictures of the movie-film, or whether motion vectors are reliable enough to allow for a motion-compensated picture signal processing mode. The invention further relates to a television signal receiver including such a picture signal processing mode controlling apparatus.

Many recent proposals for novel High-Definition TeleVision (HDTV) systems include the requirement that a control signal is to be transmitted along with the HDTV signal which gives an indication about the origin of the picture signal, because in some respects, picture signals originating from movie-film require a different treatment, i.e. picture signal processing mode, than picture signals which are picked up by a video camera from a live scene and transmitted directly or recorded on tape or disc and subsequently transmitted as the picture signal, herein termed "non-movie-film picture signals". For similar reasons, up-conversion algorithms to be used in Improved Definition TeleVision (IDTV) receivers require a picture signal processing mode control signal which provides information about the origin of the picture signal. Up till now, no reliable and yet simple method of automatically detecting whether the picture signal originates from movie-film has been reported. Another problem met in IDTV receivers is that motion-compensated picture signal processing methods are potentially very suitable to provide an improved display quality of the picture signal, but that artifacts caused by motion vector estimation errors are very disturbing. Consequently, there is a need to determine when motion vectors are reliable enough to allow for a motion-compensated picture signal processing mode, and when the motion-compensated picture signal processing mode should be switched off in view of the unreliability of the motion vectors.

SUMMARY OF THE INVENTION

It is, inter alia, an object of the invention to provide a simple and reliable picture signal processing mode control. For this purpose, a first aspect of the invention provides a method as defined in claim 1 while a second aspect of the invention provides an apparatus as defined in claim 8. Claim 15 defines a receiver for television signals in which the picture signal processing mode controlling apparatus of claim 8 is used to enhance received and decoded television signals. Advantageous embodiments of the invention are defined in the subclaims.

The invention is based on the recognition that when a picture signal processor already comprises a motion vector estimator for furnishing motion vectors, a simple comparison of the motion vectors estimated for successive fields provides a reliable indication of whether the picture signal originates from film and, more specifically, how the television picture signal fields relate to the movie-film pictures. As 24 Hz film pictures are usually converted into 50 Hz television fields by scanning each film picture twice, there is no motion between the television fields which correspond to the same film picture, while there will be a finite amount of motion between television fields which do not correspond to the same film picture. A comparison of the sum of the lengths of the motion vectors of two successive fields will thus provide sufficient information about the source of the picture signal.

As the transition between two successive film pictures may occur either between an even and an odd television field or between an odd and an even television field, two different film phases are possible. The first option is standardized for broadcasting, while television signals on laser vision discs have been recorded by using the second option. The option which has been used can easily be detected by a similar observation of the lengths of the motion vectors.

When a comparison of motion vectors estimated for the same spatial positions in first and second fields shows that they differ to a large extent, these vectors will not be very reliable so that it is advantageous to switch over to a non-motion-compensated processing mode.

These and other aspects of the invention will be apparent from and elucidated with reference to the embodiments described hereinafter.

In the drawings:

DETAILED DESCRIPTION OF THE PREFERRED EMBODIMENTS OF THE INVENTION

Figure 1:
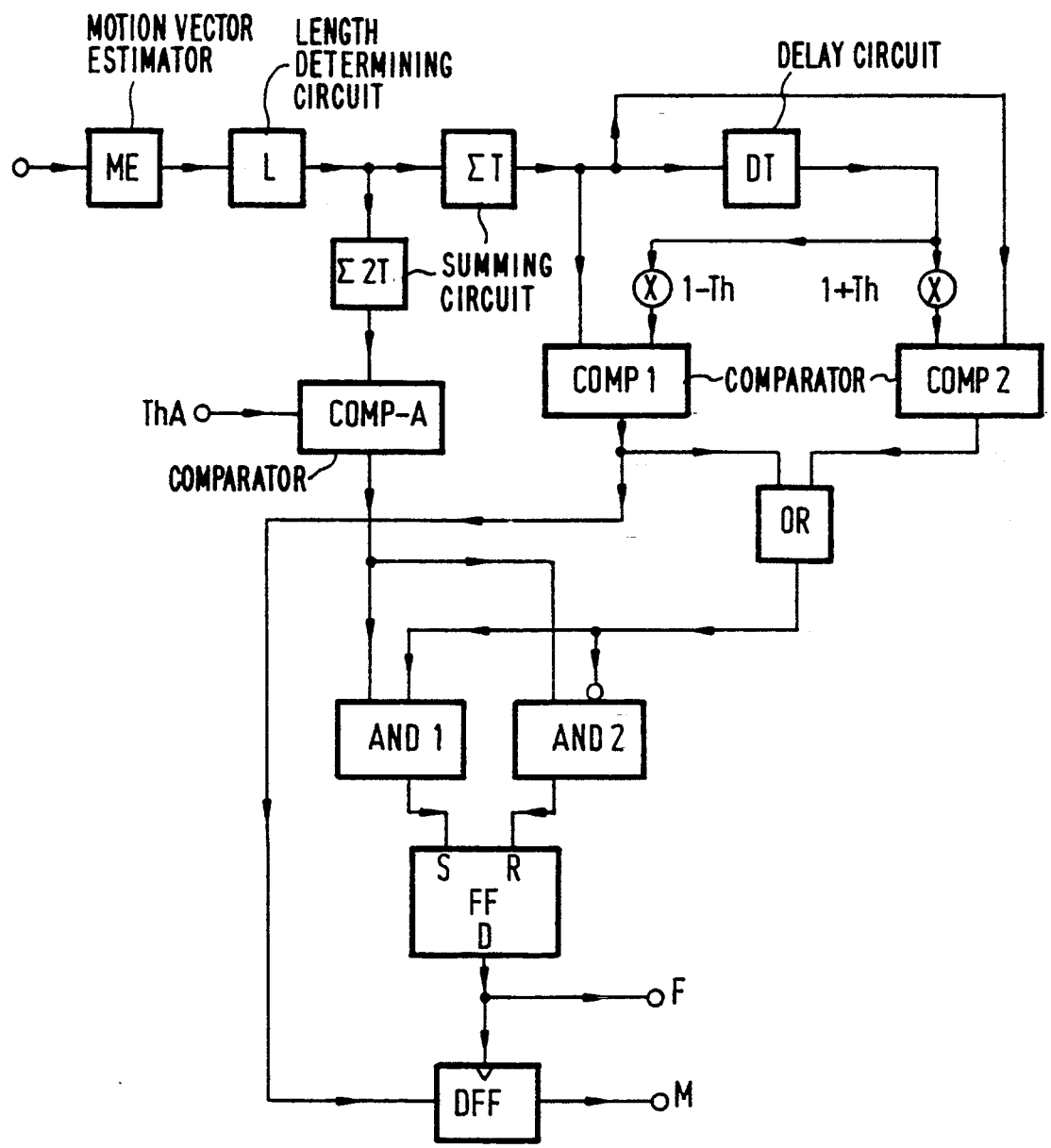
FIG. 1 shows an embodiment of a first apparatus in accordance with the invention for determining whether picture signals originate from movie-film.

In FIG. 1, a picture signal is applied to a motion vector estimator ME. The motion vectors estimated by the motion vector estimator ME are applied to a length-determining circuit L, which may determine the true length of the motion vectors by taking the root of the sum of the squares of horizontal and vertical components of the motion vectors, or which may simply sum the absolute values of these components. The output of the length determining circuit L is applied to a first summing circuit $\Sigma_{2T}$ which determines the sum of the motion vectors of two subsequent field periods. This sum is a measure of the amount of activity in the picture signal and is thus called the activity signal. The output of the first summing circuit $\Sigma_{2T}$ is compared to an activity threshold ThA by an activity comparator COMP-A to obtain an activity enable signal. The arrangement will only change its decisions about whether the picture signal originates from film if there is sufficient motion in the picture to warrant a reasonably reliable decision.

The output of the length determining circuit L is also applied to a second summing circuit $\Sigma_T$ which determines the sum of the motion vectors of the present field period. The output of the second summing circuit $\Sigma_T$ is delayed by a field period T by a delay circuit $D_T$ which furnishes the summed vector lengths of a previous field period. The output of the delay circuit $D_T$ is multiplied by $1-Th$ and by $1+Th$ so as to ensure that a decision that the picture fields originate from movie-film is only taken if the summed vector length of the present field is smaller than the summed vector length of the previous field by more than a first given threshold or if the summed vector length of the present field is larger than the summed vector length of the previous field by more than a second given threshold. To this end, the output of the second summing circuit $\Sigma_T$ is applied to first inputs of first and second comparators COMP1 and COMP2, whose second inputs are coupled to the output of the delay circuit $D_T$ through multipliers which multiply by $1-Th$ and $1+Th$, respectively. A logic OR-circuit combines the outputs of the comparators COMP1 and COMP2. The output of the logic OR-circuit is applied to a non-inverting input of a first logic AND-circuit AND1 and to an inverting input of a second logic AND-circuit AND2, which logic AND-circuits further receive the activity enable signal from the comparator COMP-A. The output of the first logic AND-circuit AND1 is coupled to a set input S of a set-reset flipflop FF. The output of the second logic AND-circuit AND2 is coupled to a reset input R of the set-reset flipflop FF. A data output D of the flipflop FF supplies a film indication signal F.

To determine whether the transition between two successive film pictures is between an even and an odd field or between an odd and an even field, the data output D of the flipflop FF is coupled to a clock input of a D-flipflop DFF, whose data input is coupled to the output of the first comparator COMP1. The D-tiptop DFF supplies a transition mode indication signal M which is positive if the transition between two film pictures is between an even and an odd television field. The indication signals F and M can be applied for controlling the operation of a subsequent picture signal processing unit.

The arrangement shown in FIG. 1 operates as follows: if the summed vector lengths of two successive fields do not differ too much, the output of the logic OR-circuit will be logic zero, and the flipflop FF will be reset to indicate that the television picture fields do not originate from film. If on the other hand, either one of the comparators COMP1 and COMP2 indicates a difference between the summed vector lengths by more than a given threshold, the output of the logic OR-circuit will be logic one, and the flipflop FF will be set to indicate that the television picture fields originate from film. When the comparisons are made during even field periods, a positive output of comparator COMP1 which indicates that the vectors of the present even field to the previous odd field are smaller than the vectors of the previous odd field to its preceding even field, also indicates that the present even field and the previous odd field correspond to the same film picture, so that the transition between two film pictures will take place between the present even field and the next odd field. Such a positive output of the first comparator can thus easily be used to indicate that the movie-film source material is scanned in the manner standardized for broadcasting.

Figure 2:
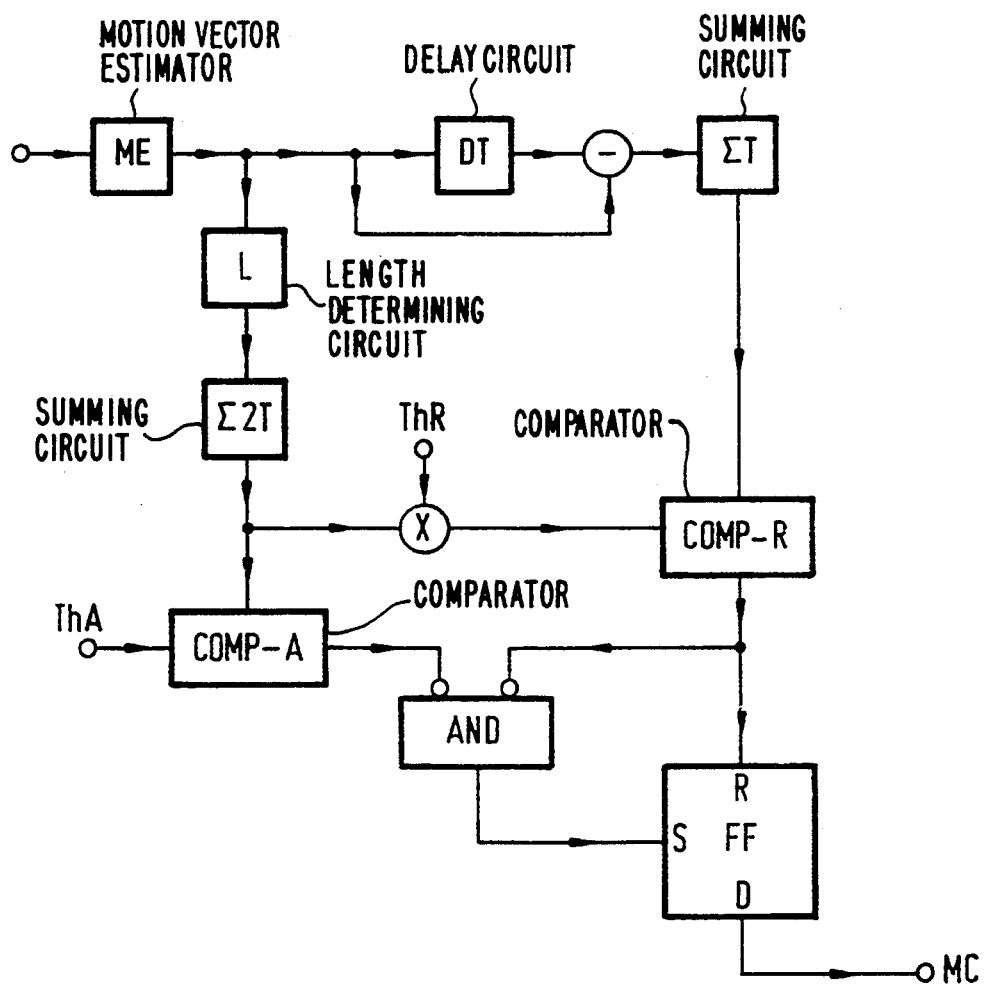
FIG. 2 shows an embodiment of a second apparatus in accordance with the invention for determining whether the picture signal processing should be motion-compensated.

FIG. 2 shows an embodiment of an arrangement which determines whether the motion vectors are reliable enough to allow for a motion-compensated processing mode. In FIG. 2, the picture signal is applied to the motion vector estimator ME. The motion vectors estimated by the motion vector estimator ME are applied to the length determining circuit L, which may determine the true length of the motion vectors by taking the root of the sum of the squares of horizontal and vertical components of the motion vectors, or which may simply sum these components. The output of the length determining circuit L is applied to the first summing circuit $\Sigma_{2T}$ which determines the sum of the motion vectors of two subsequent field periods. This sum is a measure of the amount of activity in the picture signal and is thus called the activity signal. The output of the first summing circuit $\Sigma_{2T}$ is compared to the activity threshold ThA by the activity comparator COMP-A to obtain the activity enable signal. The arrangement will only switch over to the motion-compensated picture signal processing mode when the motion vectors are small enough to warrant a reasonably reliable decision, i.e. when the activity enable signal is logic zero.

The output of the motion vector estimator ME is also applied to the field delay circuit $D_T$. The difference between the input and the output of the field delay circuit $D_T$ is applied to the second summing circuit $\Sigma_T$ which determines the sum of the differences between the motion vectors of the present field period and the motion vectors of a previous field period for corresponding spatial positions. The output of the second summing circuit $\Sigma_T$ is applied to a first input of a comparator COMP-R, whose second input is coupled to the output of the first summing circuit $\Sigma_{2T}$ through a multiplier which multiplies the activity signal by a reliability threshold ThR. It is thereby ensured that a decision that the motion vectors are not reliable enough to allow for a motion compensated picture signal processing mode is only taken if the sum of the vector length differences divided by the activity signal exceeds the reliability threshold ThR. The output of the comparator COMP-R is coupled to the reset input R of the set-reset flipflop FF. The output of the comparator COMP-R is also coupled to an inverting input of a logic AND-circuit whose other inverting input receives the activity enable signal from the comparator COMP-A. The output signal of the logic AND-circuit is only logic one if the summed vector differences are small enough and if the activity signal is below the activity threshold ThA. The output of the logic AND-circuit is coupled to the set input S of the set-reset flipflop FF. The data output D of the flipflop FF supplies a motion-compensated processing mode indication signal MC.

While a hard switching between a motion-compensated picture signal processing mode and a non-motion-compensated picture signal processing mode has been described, it will be obvious that a soft switching is possible as well. In that case, the outputs of the first summing circuit $\Sigma_{2T}$ and the second summing circuit $\Sigma_T$ could be advantageously applied to a read-only memory for determining an attenuation factor for the motion vectors. If the summed temporal differences between the motion vectors for corresponding spatial positions were too high, the attenuation factor would be zero so that the picture signal processing would effectively be non-motion-compensated. On the other hand, if the summed temporal differences were within the normal range, the motion vectors would be applied unattenuated. When the motion vectors differences are a little out of the normal range, the motion vectors could be attenuated by, for example, halving the amplitudes of the motion vector components. By such a soft switching, switching artifacts between the two processing modes are avoided.

The above description clearly shows that a simple comparison of motion vectors determined for successive fields can easily be used to determine the picture signal processing mode and, more specifically, whether and how the picture signal processing should be adapted for movie-film originated pictures and whether the motion vectors are reliable enough to allow for a motion-compensated picture signal processing. The comparisons are preferably related to the total amount of motion in the picture, which can very simply be determined by adding the motion vector lengths of a television frame period. Switching between a movie-film adapted processing mode and a non-movie-film adapted processing mode is preferably only made when there is enough motion in the picture to warrant a reliable decision. On the other hand, after a switch-off of the motion-compensated processing mode because the motion vectors appeared to vary too much in time to be reliable, the motion-compensated processing mode is preferably only reinstalled when the amount of motion during a frame period has fallen below a certain activity threshold to warrant a reliable decision. As there will be no motion between the two television fields which originate from the same movie-film picture, the presence of movie-film originated television signals can very simply be determined by comparing the sums of the motion vector lengths of two field periods. More specifically, movie-film originated picture signals can be deemed to be present when the sum of the motion vector lengths of one field does not differ from the sum of the motion vector lengths of the other field by more than given thresholds. These thresholds are preferably related to the sum of the motion vector lengths, which can easily be obtained by multiplying the vector length sum of one of the fields by 1−Th and by 1+Th to obtain the range between which the vector length sum of the other field should be when non-movie-film originated picture signals are present.

It should be noted that the above-mentioned embodiments illustrate rather than limit the invention, and that those skilled in the art will be able to design many alternative embodiments, without departing from the scope of the appended claims.

We claim:

1. A method of generating a control signal indicating whether a received picture signal originated from a movie-film source or from a non-movie-film source by a video camera for controlling a picture signal processing mode for the received picture signals, comprising the steps of:
    (a) determining first motion vectors for a first field of the received picture signals,
    (b) determining second motion vectors for a second field of the received picture signals,
    (c) comparing said first and second motion vectors and based upon said comparison generating a control signal indicating whether the received picture signal originated from a movie-film source or from a non-movie-film source by a video camera.

2. A method of controlling a picture signal processing mode as claimed in claim 1, wherein said comparing step comprises the further steps of:
    determining a sum of lengths of said first and second motion vectors to obtain an activity signal; and
    changing said picture signal processing mode control signal only when said activity signal has a predetermined relation with an activity threshold.

3. A method of controlling a picture signal processing mode as claimed in claim 2, wherein when said picture signal processing mode control signal indicates that said picture signal originates from movie-film, said picture signal processing mode control signal is only changed when said activity signal exceeds said activity threshold.

4. A method of controlling a picture signal processing mode as claimed in claim 2, wherein when said picture signal processing mode control signal indicates that said picture signal processing mode is motion-compensated, said picture signal processing mode control signal is changed to indicate a motion-compensated picture signal processing mode when said activity signal falls below said activity threshold, while said picture signal processing mode control signal is changed to indicate a non-motion-compensated picture signal processing mode when a sum of differences between said first and second motion vectors at corresponding spatial positions exceeds a reliability threshold.

5. A method of controlling a picture signal processing mode as claimed in claim 1, wherein when said picture signal processing mode control signal indicates whether said picture signal originates from movie-film, said comparing step comprises the further steps of:
    determining a first total of lengths of said first motion vectors;
    determining a second total of lengths of said second motion vectors; and
    changing said picture signal processing mode control signal to indicate movie-film when said first and second totals differ by more than given thresholds and to indicate non-movie-film when said first and second totals differ by less than said given thresholds.

6. A method of controlling a picture signal processing mode as claimed in claim 5, wherein said given thresholds depend on said first or said second total.

7. A method of controlling a picture signal processing mode as claimed in claim 5, wherein said picture signal processing mode control signal indicates a first type of movie-film originating picture signals when said first total is smaller than said second total by more than a first given threshold, while said picture signal processing mode control signal indicates a second type of movie-film originating picture signals when said first total is larger than said second total by more than a second given threshold.

8. Apparatus for generating a control signal indicating whether a received picture signal originated from a movie-film source or from a non-movie-film source by a video camera for controlling a picture signal processing mode for the received picture signals, comprising:
    (a) means for determining first motion vectors for a first field of the received picture signals,
    (b) means for determining second motion vectors for a second field of the received picture signals,
    (c) means for comparing said first and second motion vectors and based upon said comparison for generating a control signal indicating whether the received picture signal originated from a movie-film source or from a non-movie-film source by a video camera.

9. An apparatus for controlling a picture signal processing mode as claimed in claim 8, wherein when said comparing means comprise:
 means for determining a sum of lengths of said first and second motion vectors to obtain an activity signal; and
 means for changing said picture signal processing mode control signal only when said activity signal has a predetermined relation with an activity threshold.

10. Apparatus for generating a control signal as claimed in claim 9, wherein said means for changing said picture signal processing mode control signal is operative only when said activity signal exceeds said activity threshold, and wherein said comparing means comprises a comparator for comparing said activity signal to said activity threshold and a logic circuit having an input coupled to said comparator.

11. Apparatus for generating a control signal as claimed in claim 9, wherein, when said picture signal processing mode control signal indicates that said picture signal processing mode is motion-compensated, said means for changing said picture signal processing mode control signal is operative to indicate a motion-compensated picture signal processing mode when a sum of differences between said first and second motion vectors at corresponding spatial positions exceeds a reliability threshold, and wherein said comparing means comprises a comparator for comparing said activity signal to said activity threshold and a logic circuit having an input coupled to said comparator.

12. An apparatus for controlling a picture signal processing mode as claimed in claim 8, wherein when said picture signal processing mode control signal indicates whether said picture signal originates from movie-film, said comparing means comprise:
 means for determining a first total of lengths of said first motion vectors and a second total of lengths of said second motion vectors; and
 means coupled to said determining means for changing said picture signal processing mode control signal to indicate movie-film when said first and second totals differ by more than given thresholds and to indicate non-movie-film when said first and second totals differ by less than said given thresholds.

13. An apparatus for controlling a picture signal processing mode as claimed in claim 12, wherein said given thresholds depend on said first or said second total.

14. An apparatus for controlling a picture signal processing mode as claimed in claim 12, wherein said picture signal processing mode control signal indicates a first type of movie-film originating picture signals when said first total is smaller than said second total by more than a first given threshold, while said picture signal processing mode control signal indicates a second type of movie-film originating picture signals when said first total is larger than said second total by more than a second given threshold; and wherein said comparing means comprise first and second comparators having first inputs coupled to receive said first total and second inputs coupled to receive said second total, outputs of said comparators being coupled to a logic circuit.

15. A receiver for television signals, comprising:
 means for receiving and decoding said television signals to obtain picture signals;
 means coupled to said receiving and decoding means for enhancing said picture signals;
 characterized in that said enhancing means include an apparatus for controlling a picture signal processing mode as defined in claim 8.

16. A method of controlling a picture signal processing mode as claimed in claim 3, wherein when said picture signal processing mode control signal indicates that said picture signal originates from movie-film, said comparing step comprises the further steps of:
 determining a first total of lengths of said first motion vectors;
 determining a second total of lengths of said second motion vectors; and
 changing said picture signal processing mode control signal to indicate movie-film when said first and second totals differ by more than given thresholds and to indicate non-movie-film when said first and second totals differ by less than said given thresholds.

17. A method of controlling a picture signal processing mode as claimed in claim 16, wherein said given thresholds depend on said first or said second total.

18. An apparatus for controlling a picture signal processing mode as claimed in claim 10, wherein when said picture signal processing mode control signal indicates that said picture signal originates from movie-film, said comparing means comprise:
 means for determining a first total of lengths of said first motion vectors and a second total of lengths of said second motion vectors; and
 means coupled to said determining means for changing said picture signal processing mode control signal to indicate movie-film when said first and second totals differ by more than given thresholds and to indicate non-movie-film when said first and second totals differ by less than said given thresholds.

19. An apparatus for controlling a picture signal processing mode as claimed in claim 18, wherein said given thresholds depend on said first or said second total.

20. An apparatus for controlling a picture signal processing mode as claimed in claim 13, wherein said picture signal processing mode control signal indicates a first type of movie-film originating picture signals when said first total is smaller than said second total by more than a first given threshold, while said picture signal processing mode control signal indicates a second type of movie-film originating picture signals when said first total is larger than said second total by more than a second given threshold; and wherein said comparing means comprise first and second comparators having first inputs coupled to receive said first total and second inputs coupled to receive said second total, outputs of said comparators being coupled to a logic circuit.

* * * * *